(12) United States Patent
Chen et al.

(10) Patent No.: US 7,184,224 B2
(45) Date of Patent: Feb. 27, 2007

(54) PROJECTION OPTICAL SYSTEM

(75) Inventors: Shou-Chih Chen, Chu-Nan (TW); Hung-Chieh Huang, Chu-Nan (TW)

(73) Assignee: Coretronic Corporation (TW)

( * ) Notice: Subject to any disclaimer, the term of this patent is extended or adjusted under 35 U.S.C. 154(b) by 0 days.

(21) Appl. No.: 11/211,992

(22) Filed: Aug. 24, 2005

(65) Prior Publication Data

US 2006/0092496 A1    May 4, 2006

(30) Foreign Application Priority Data

Oct. 29, 2004    (TW) ............................. 093133121 A

(51) Int. Cl.
G02B 9/00 (2006.01)
G02B 26/08 (2006.01)
G02B 21/14 (2006.01)

(52) U.S. Cl. ...................... 359/738; 359/298; 353/97

(58) Field of Classification Search ................ 359/290, 359/291, 292, 298, 738–740; 353/88, 97
See application file for complete search history.

(56) References Cited

U.S. PATENT DOCUMENTS

| 6,870,689 B2 * | 3/2005 | Yoshida ................... 359/683 |
| 2004/0004875 A1 | 1/2004 | Honda | |
| 2005/0036216 A1 * | 2/2005 | Lee ........................... 359/738 |

* cited by examiner

Primary Examiner—Ricky Mack
Assistant Examiner—William Choi
(74) Attorney, Agent, or Firm—Andrew D. Fortney

(57) ABSTRACT

A projection optical system includes a light source, a digital micromirror device (DMD), a projection lens and a first block sheet. The light source provides an illumination light. The DMD includes a plurality of micromirrors, and the angles of each micromirrors are changed individually according to an input signal for separating the illumination light reflected from the micromirrors into a signal light, a first stray light and a second stray light. The signal light passes through the projection lens and is further projected onto a screen. The first block sheet is disposed closely to the projection lens to allow the first stray light and the second stray light to be fully shielded off by the first block sheet and thus not to reach the projection lens.

10 Claims, 4 Drawing Sheets

PROJECTION OPTICAL SYSTEM

BACKGROUND OF THE INVENTION

1. Field of the Invention

The present invention relates to a projection optical system, and more particular to a projection optical system capable of effectively eliminating stray light.

2. Description of the Prior Art

The digital micromirror device (DMD) is an image display device. The DMD is usually used in a conventional projection optical system for adjusting an illumination light from an illumination light source. The DMD comprises a plurality of micromirrors, and it is controlled by an inputted signal to rotate, so as to reflect the illumination light in three separate directions. Accordingly, the projection optical system can provide an image with high resolution.

Referring to FIG. 1, FIG. 1 is a schematic diagram of the projection optical system 10 of the prior art. In the projection optical system 10, the DMD 14 comprises a plurality of micromirrors arranged in an array thereon. Each of the micromirrors is controlled by an inputted signal to rotate respectively. When a micromirror is rotated to +12 degree, it is in an ON state; when a micromirror is rotated to 0 degree, it is in a FLAT state, and when a micromirror is rotated to −12 degree, it is in an OFF state. In the DMD 14, those micromirrors in the ON state reflect the illumination light shone thereon to generate a signal light 22; those micromirrors in the FLAT state reflect the illumination light shone thereon to generate a first stray light 18, and those micromirrors in the OFF state reflect the illumination light shone thereon to generate a second stray light 20. If the above stray lights 18 and 20 are projected with the signal light 22 into the projection lens, the luminance of the signal light will be seriously lost, such that the contrast of projected image will be worse, and the resolution of the image will be influenced.

In the projection optical system 10 of the prior art, a block sheet 16 is disposed between a projection lens 12 and a DMD 14 to shield off the second stray light 20. However, the height of the block sheet 16 of the prior art can only fully shield off the second stray light 20 and cannot shield off the first stray light 18, so the first stray light 18 will directly be projected into the projection lens 12, causing worse contrast of the image. The present solution for the above problem is to elongate the block sheet 16 to shield off the first stray light 18. However, there are areas where the first stray light 18 and the signal light 22 overlap, so when the block sheet 16 is elongated to fully shield off the first stray light 18, a portion of the signal light 22 will be also shielded off. The contrast of the projected image will be worse, and the resolution of the image will be influenced.

With the development of science and technology, the demand on high image resolution is higher and higher. Since the block sheet of the prior art cannot fully shield off the stray light, such that the image resolution is influenced, the present invention provides a projection optical system capable of effectively eliminating the stray light to solve the above-mentioned problems.

SUMMARY OF THE INVENTION

The objective of the present invention is to provide a projection optical system for fully shielding off the stray light to improve the contrast and the resolution of the projected image.

The other objective of the present invention is to provide a projection optical system capable of effectively dispersing the heat of the stray light to lower the temperature of the system.

In an embodiment, the projection optical system of the present invention comprises an illumination light source, a digital micromirror device (DMD), a projection lens, and a first block sheet. The illumination light source is used for providing an illumination light. The DMD comprises a plurality of micromirrors for separating the illumination light into a signal light, a first stray light, and a second stray light by varying, in accordance with a signal, the respective angles at which each micromirror reflects the illumination light shone thereon. The signal light passes through the projection lens and is further projected onto a screen. The first block sheet is disposed closely to the projection lens for shielding off the first stray light and the second stray light without shielding off the signal light. Since the first block sheet can fully shield off the first stray light and the second stray light, the contrast and the resolution of the projected image is improved.

In an embodiment, the projection optical system of the present invention further comprises a heat sink. The heat sink is disposed between the DMD and the first block sheet and closely to the first block sheet. The heat sink is used for dispersing the heat of the first stray light and the second stray light.

Therefore, the projection optical system of the present invention can fully shield off the stray light by disposing the first block sheet at a specific position, such that the contrast and the resolution of the projected image is improved. Furthermore, the present invention utilizes the heat sink to disperse the heat of the stray light to lower the temperature of the system.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
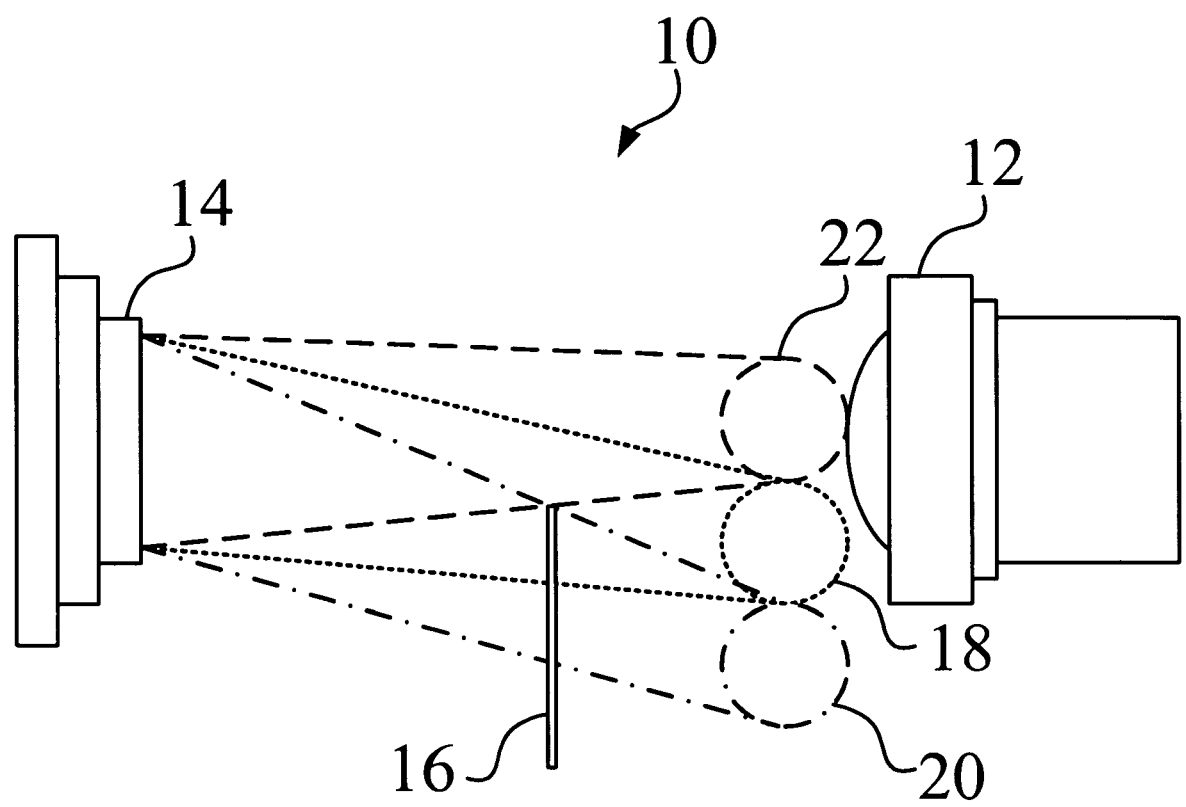
FIG. 1 is a schematic diagram of the projection optical system of the prior art.
Figure 2:
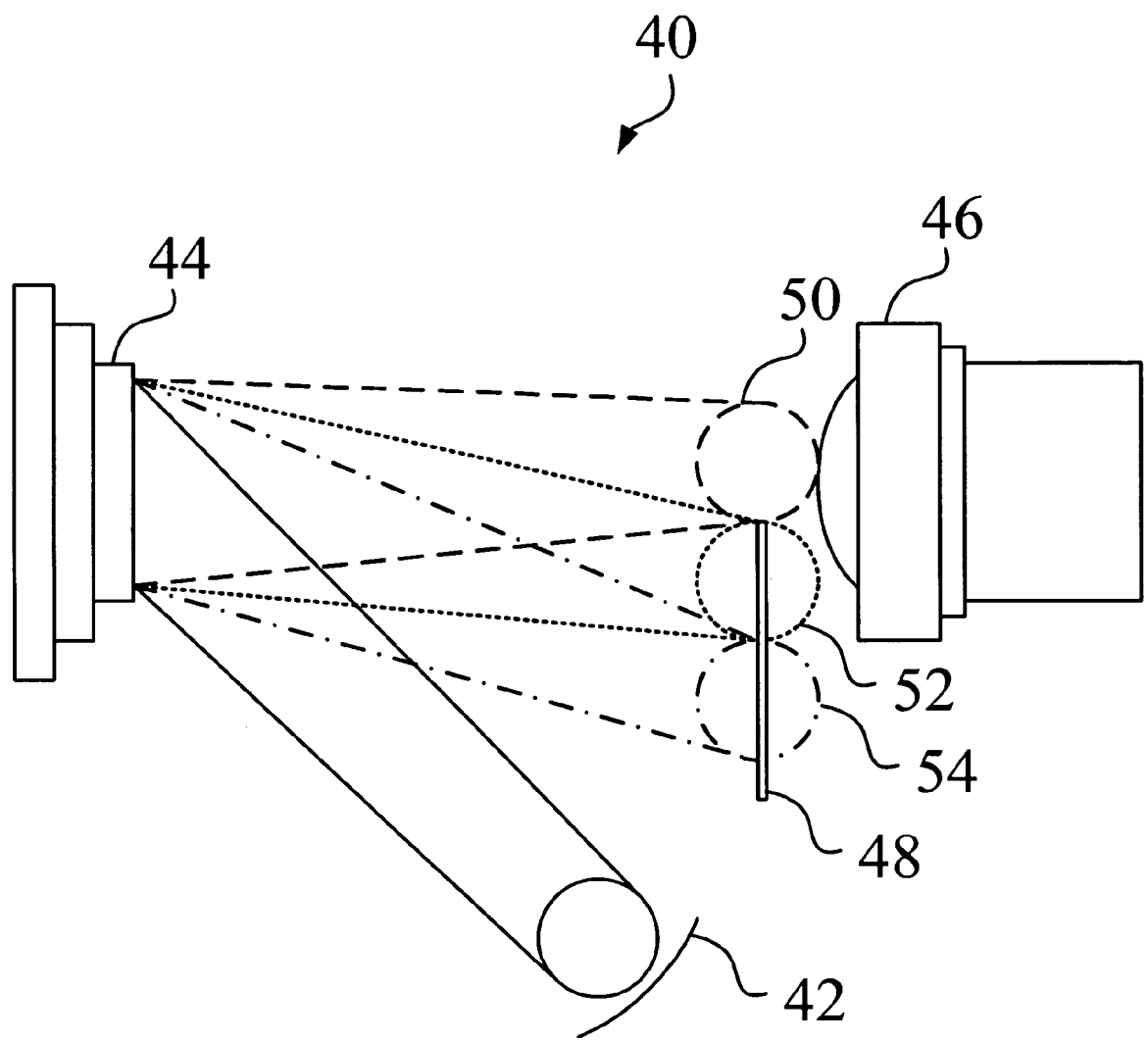
FIG. 2 is a schematic diagram of the projection optical system according to one embodiment of the present invention.

Referring to FIG. 2, FIG. 2 is a schematic diagram of the projection optical system 40 according to one embodiment of the present invention. To describe the figure more clearly, the lights shown in FIG. 2 are respectively marked with different lines. According to the present invention, the projection optical system 40 comprises an illumination light source 42, a digital micromirror device (DMD) 44, a projection lens 46 and a first block sheet 48. The illumination light source 42 is used for providing an illumination light.

The DMD 44 comprises a plurality of micromirrors for separating the illumination light into a signal light 50, a first stray light 52, and a second stray light 54 by varying, in accordance with a signal, the respective angles at which each micromirror reflects the illumination light shone thereon. When each of the micromirrors respectively rotates to +12 degree to be in an ON state, each micromirror reflects the illumination light shone thereon to generate the signal light 50; when each of the micromirrors respectively rotates to 0 degree to be in a FLAT state, each micromirror reflects the illumination light shone thereon to generate the first stray light 52, and when each of the micromirrors respectively rotates to −12 degree to be in an OFF state, each micromirror reflects the illumination light shone thereon to generate the second stray light 54. The signal light 50 passes through the projection lens 46 and is further projected onto a screen (not shown in FIG. 2). The first block sheet 48 is disposed closely to the projection lens 46 for fully shielding off the first stray light 52 and the second stray light 54, such that the first stray light 52 and the second stray light 54 will not reach the projection lens 46. If closer to the projection lens 46, the overlapped area between the signal light 50 and the first stray light 52 is smaller. Accordingly, the first block sheet 48 disposed closely to the projection lens 46 can effectively shield off the first stray light 52 and the second stray light 54, such that the first stray light 52 and the second stray light 54 will not pass through the projection lens 46. When the system displays a dark image, the brightness is lowered. Therefore, the contrast of the image displayed by the system is improved.

In an embodiment, the projection optical system 40 further comprises a housing (not shown in FIG. 2). The first block sheet 48 is formed on the housing based on optical principles.

Figure 3:
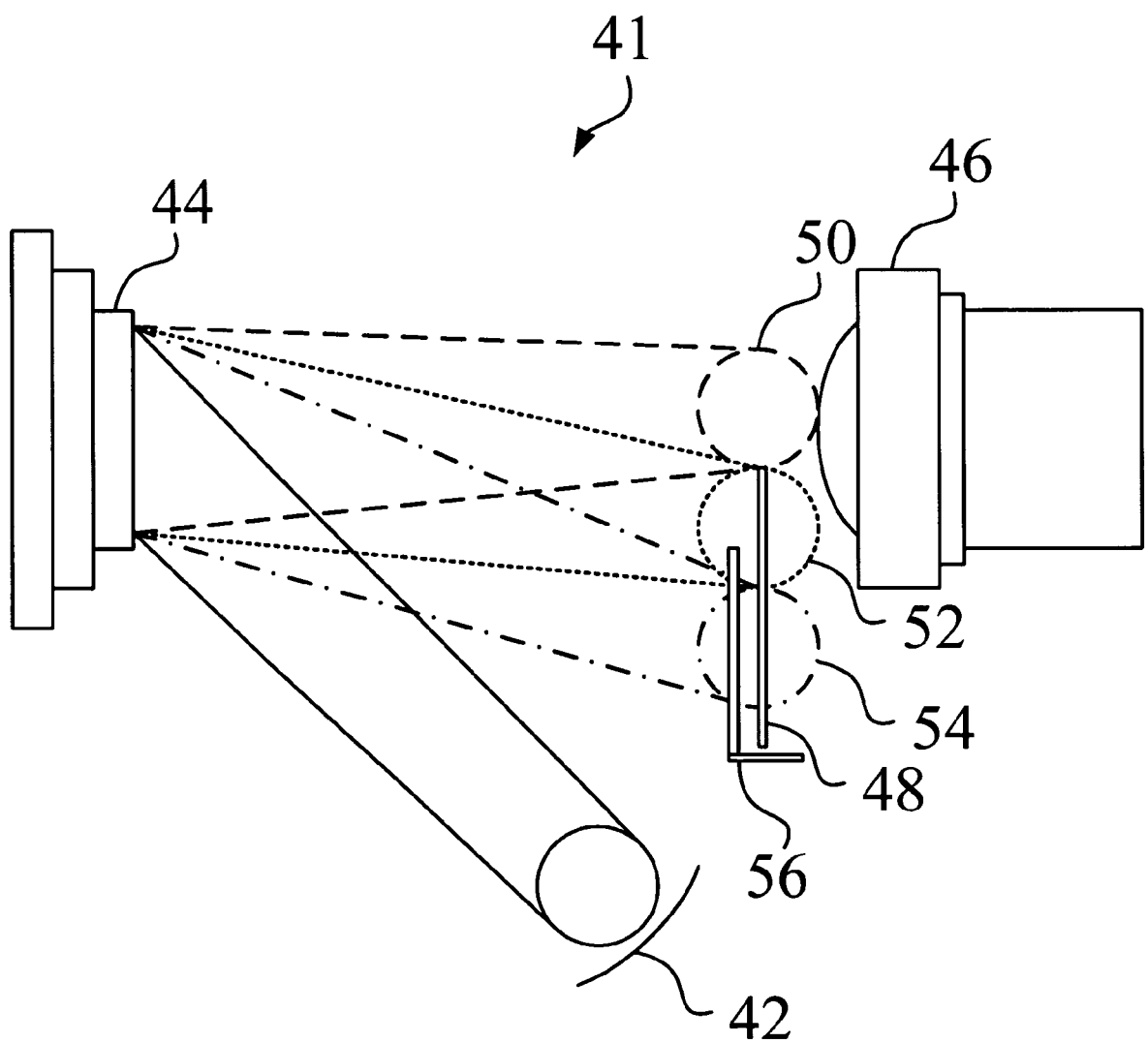
FIG. 3 is a schematic diagram of the projection optical system according to another embodiment of the present invention.

Referring to FIG. 3, FIG. 3 is a schematic diagram of the projection optical system 41 according to another embodiment of the present invention. To describe the figure more clearly, the lights shown in FIG. 3 are respectively marked with different lines. The main difference between the projection optical system 41 and the projection optical system 40 is that the projection optical system 41 comprises a heat sink 56. The heat sink 56 is disposed between the DMD 44 and the first block sheet 48, and the heat sink 56 is connected to the first block sheet 48 to disperse the heat around the first block sheet 48.

Figure 4:
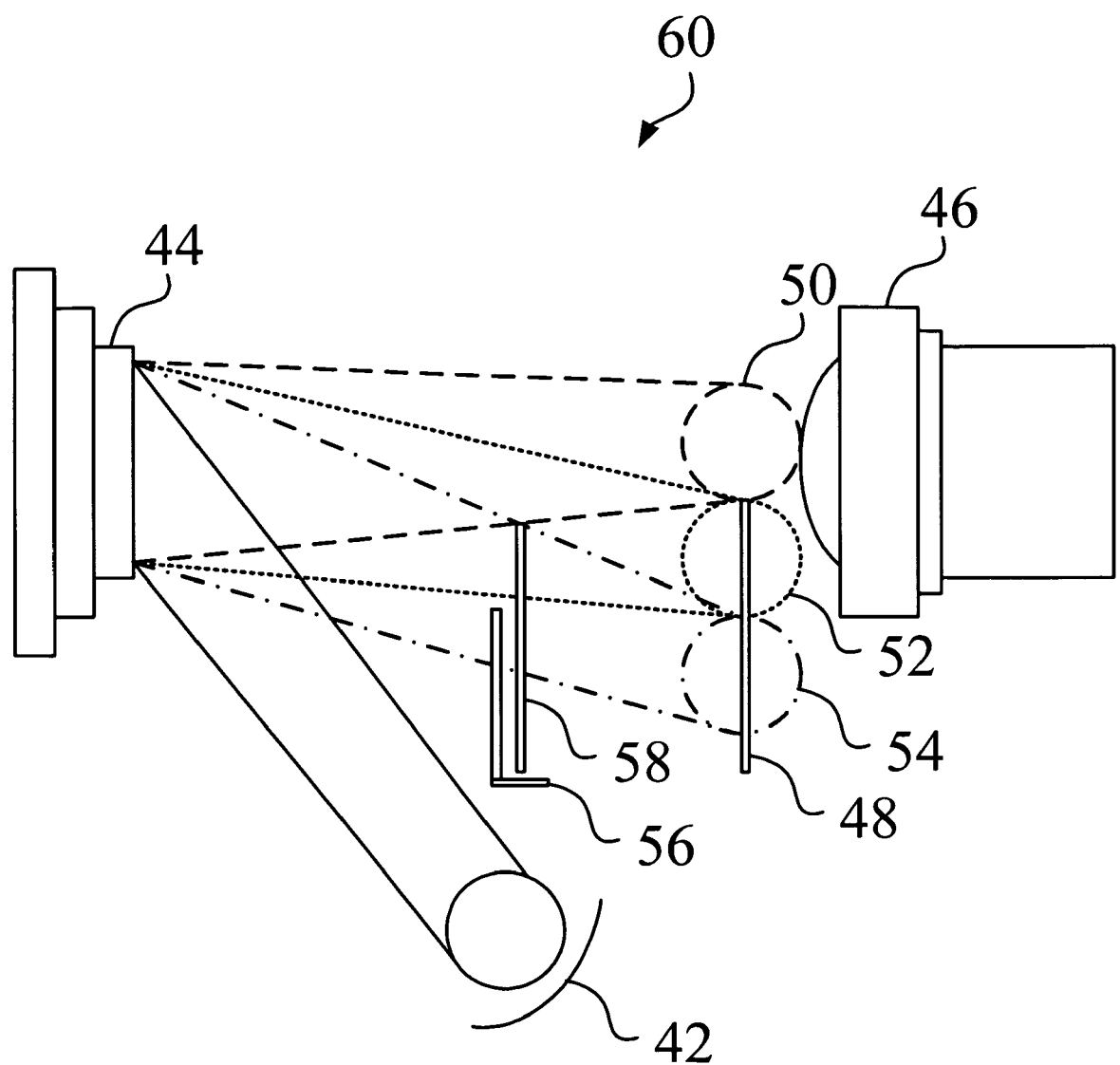
FIG. 4 is a schematic diagram of the projection optical system according to still another embodiment of the present invention.

Referring to FIG. 4, FIG. 4 is a schematic diagram of the projection optical system 60 according to still another embodiment of the present invention. To describe the figure more clearly, the lights shown in FIG. 4 are respectively marked with different lines. The main difference between the projection optical system 60 and the projection optical system 41 is that the projection optical system 60 further comprises a second block sheet 58, and the heat sink 56 is connected to the second block sheet 58 to disperse the heat around the second block sheet 58. In the projection optical system 60, the second block sheet 58 is disposed between the DMD 44 and the first block sheet 48 and is used for shielding off the first stray light 52 partially and the second stray light 54 fully. The rest of the first stray light, which is not shielded off by the second block sheet 58, is further fully shielded off by the first block sheet 48. In an embodiment, the first block sheet 48 and the second block sheet 58 are both formed on a housing (not shown in FIG. 4) of the projection optical system 60.

Compared to the prior art, the present invention disposes the first block sheet closely to the projection lens to effectively shield off the stray light without shielding off the signal light. Therefore, the contrast and the resolution of the projected image are improved. Furthermore, the present invention utilizes the heat sink to disperse the heat of the stray light to lower the temperature of the system.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A projection optical system comprising:
a light source for providing an illumination light;
a digital micromirror device comprising a plurality of micromirrors, the respective angle of each micromirror varying in accordance with a signal for separating the illumination light into a signal light, a first stray light and a second stray light;
a projection lens, the signal light passing through the projection lens and projected onto a screen;
a first block sheet disposed closely to the projection lens for shielding off the first stray light and the second stray light; and
a heat sink connected to the first block sheet.

2. The projection optical system of claim 1, wherein the projection optical system further comprises a housing, the first block sheet being formed on the housing.

3. The projection optical system of claim 1, wherein when each of the micromirrors respectively rotates to +12 degree to be in an ON state, each micromirror reflects the illumination light shone thereon to generate the signal light; when each of the micromirrors respectively rotates to 0 degree to be in a FLAT state, each micromirror reflects the illumination light shone thereon to generate the first stray light, and when each of the micromirrors respectively rotates to −12 degree to be in an OFF state, each micromirror reflects the illumination light shone thereon to generate the second stray light.

4. The projection optical system of claim 1, wherein the projection optical system further comprises a second block sheet disposed between the digital micromirror device and the first block sheet for shielding off the first stray light partially and the second stray light.

5. A projection optical system comprising:
a light source for providing an illumination light;
a digital micromirror device comprising a plurality of micromirrors, the respective angle of each micromirror varying in accordance with a signal for separating the illumination light into a signal light, a first stray light and a second stray light;
a projection lens, the signal light passing through the projection lens and projected onto a screen;
a housing;
a first block sheet on the housing, disposed closely to the projection lens for shielding off the first stray light and the second stray light;
a second block sheet disposed between the digital micromirror device and the first block sheet for shielding off the first stray light partially and the second stray light; and
a heat sink connected to the second block sheet.

6. A projection optical system comprising:
a light source for providing an illumination light;
a digital micromirror device comprising a plurality of micromirrors, the respective angle of each micromirror varying in accordance with a signal for separating the illumination light into a signal light, a first stray light and a second stray light;

a projection lens, the signal light passing through the projection lens and projected onto a screen;

a first block sheet disposed closely to the projection lens for shielding off the first stray light and the second stray light; and a second block sheet disposed between the digital micromirror device and the first block sheet for shielding off the first stray light partially and the second stray light.

7. The projection optical system of claim 6, wherein the projection optical system further comprises a housing, the first block sheet being formed on the housing.

8. The projection optical system of claim 6, wherein when each of the micromirrors respectively rotates to +12 degree to be in an ON state, each micromirror reflects to illumination light shone thereon to generate the signal light; when each of the micromirrors respectively rotates to 0 degree to be in a FLAT state, each micromirror reflects the illumination light shone thereon to generate the first stray light, and when each of the micromirrors respectively rotates to −12 degree to be in an OFF state, each micromirror reflects the illumination light shone thereon to generate to second stray light.

9. The projection optical system of claim 6, wherein the projection optical system further comprises a heat sink connected to the first block sheet.

10. The projection optical system of claim 6, wherein the projection optical system further comprises a heat sink connected to the second block sheet.

* * * * *